Dec. 16, 1930.  E. R. ANDERSON  1,784,999
FRUIT PITTING APPARATUS
Filed Feb. 6, 1926  2 Sheets-Sheet 1
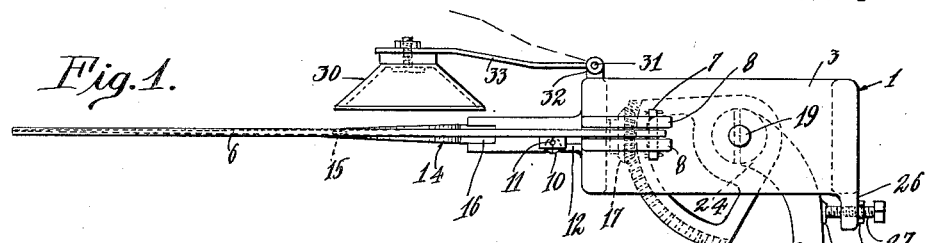
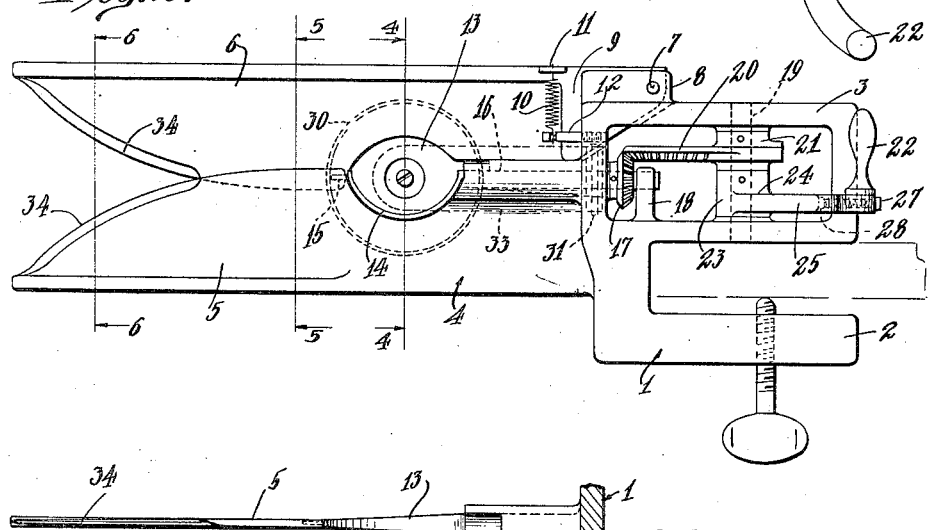
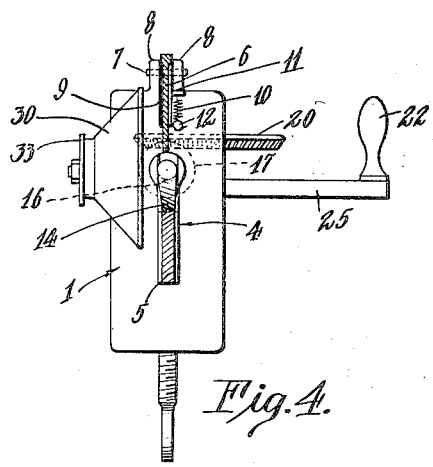
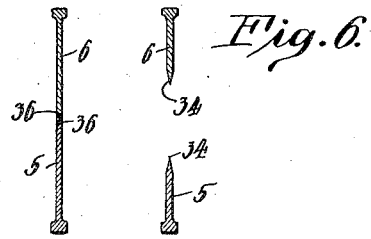
Inventor
Earl R. Anderson
By Lyon & Lyon
Attorneys Dec. 16, 1930.  E. R. ANDERSON  1,784,999
FRUIT PITTING APPARATUS
Filed Feb. 6, 1926  2 Sheets-Sheet 2
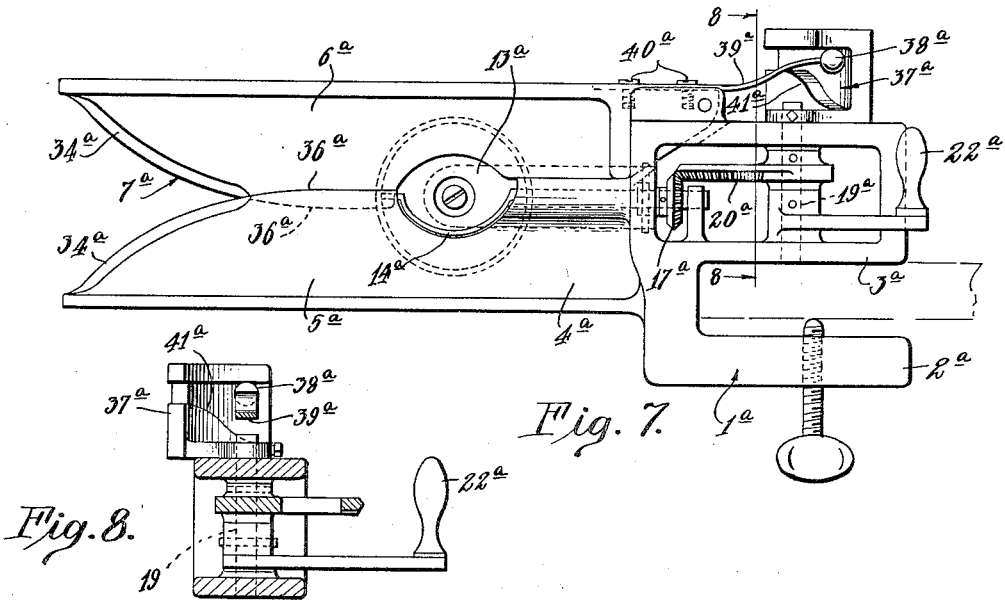
Fig. 7.
Fig. 8.
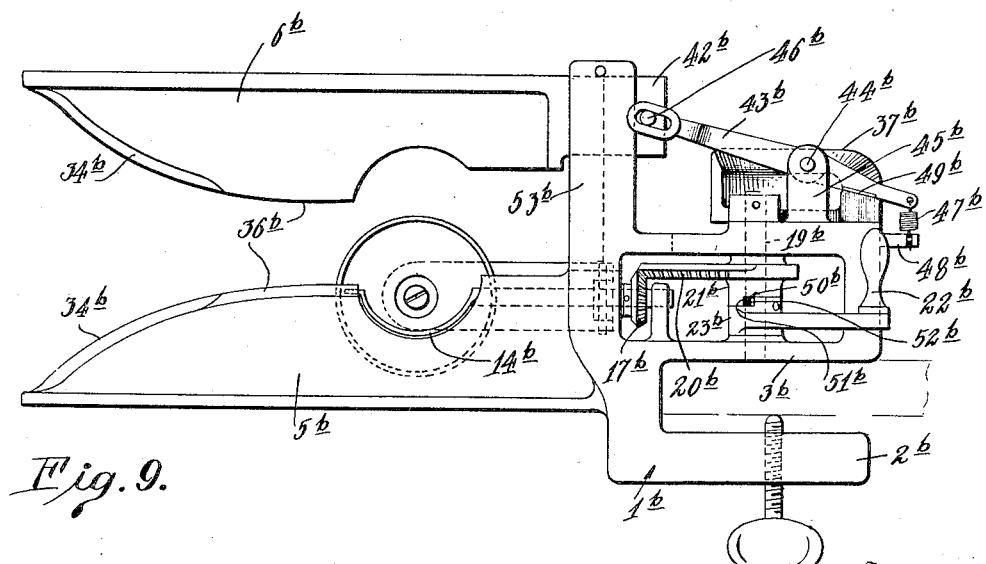
Fig. 9.
Inventor
Earl R. Anderson
By Lyon & Lyon
Attorneys.

Patented Dec. 16, 1930

1,784,999

UNITED STATES PATENT OFFICE

EARL R. ANDERSON, OF LOS ANGELES, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT-PITTING APPARATUS

Application filed February 6, 1926. Serial No. 86,424.

This invention relates to a fruit pitting apparatus and more particularly to an apparatus for pitting clingstone peaches.

This invention comprehends the provision of an apparatus for pitting peaches, providing a splitting or impaling member composed of two impaling blades, one of which is fixed relative to the other, and which blades have a scissor or cutting action so as to halve the peach completely around the pit without the necessity of manually rotating the peach on the impaling member.

Another object of this invention is to provide a fruit pitting apparatus, including an impaling member having a pair of impaler blades, one of which is fixed relative to the other, and in which impaling member a slot or recess is formed which has its greatest dimension in the plane of the cutting edges of the impaling member.

Another object of this invention is to provide a fruit pitting apparatus, including an impaling member which comprises a pair of impaler blades, one of which is movable relative to the other, and which impaler blades have cutting edges which are adapted to slide one over the other when the said blades are moved toward each other relatively and a curved pitting knife mounted in one of said blades.

Other objects and advantages of this invention will be apparent from the following detailed description of the preferred embodiment thereof as illustrated in the accompanying drawings, in which drawings:

Figure 1 is a top plan view of a fruit pitting apparatus embodying this invention.

Figure 2 is a side elevation thereof.

Figure 3 is a top plan view, partly in section of the lower fruit impaling blade embodied in this invention.

Figure 4 is a sectional end elevation of the fruit pitting apparatus taken substantially on the line 4—4 of Figure 2.

Figure 5 is a sectional end elevation taken substantially on the line 5—5 of Figure 2.

Figure 6 is an end elevation taken substantially on the line 6—6 of Figure 2.

Figure 7 is an end elevation of a modified form of fruit pitting apparatus embodying this invention.

Figure 8 is an end elevation thereof taken substantially on the line 8—8 of Figure 7.

Figure 9 is a side elevation of a third modified form of the fruit pitting apparatus embodying this invention.

In the preferred embodiment of this invention, illustrated in the accompanying drawings, 1 illustrates a frame-casting having a clamped portion 2 and a rectangular gear chamber 3. A fruit impaling member 4 is supported by the frame-casting 1. The fruit impaling member 4 comprises a lower impaling blade 5 which may be rigidly secured to or formed integral with the frame-casting 1 and a second fruit impaling member which is secured to the frame-casting 1 so as to be movable relative to the fruit impaling member 5.

In the form of this invention, illustrated in Figures 1 and 2, the movable impaling blade 6 is pivotally secured at a pin 7 to an extension 8 of the casting 1. A web 9 is formed on the impaling blade 6 which acts as a stop to engage the forward edge of the casting 1 to arrest rotation of the movable impaling blade 6 on the pin 7. A tension spring 10 is secured at one end to the impaling blade 6, as illustrated at 11, and at its opposite end to a stud 12. The stud 12 is screw-threaded to the casting 1. The tension spring 10 operates to yieldably urge the movable impaling blade 6 toward the fixed impaling blade 5. A pit receiving recess 13 is formed in the impaling member 4 and a curved pitting knife 14 is pivotally supported in this recess and adapted to be axially rotated therein, a pit extension 15 of the grooved pitting knife 14 being mounted in a bore formed in the fixed impaling member 5. The curved pitting knife 14 has a shank 16 at its opposite end which extends through the fixed impaling member 5 and is secured to a beveled gear 17 at its outer end. A bearing support 18 for the shank 16 is formed in the frame-casting 1. A shaft 19 is mounted in the rectangular gear frame 3 of the frame-casting 1 and supports a segmental beveled gear 20 which is adapted to mesh with the beveled pinion gear 17. The segmental gear 20 is rigidly secured to the shaft 19 at a hollow boss 21. A handle 22 is provided for actuating the segmental gear 20 and is secured to the shaft 19 at a boss 23 formed at the lower end 24 of the handle lever 25. The gear ratio between the beveled pinion gear 17 and the segmental gear 20 is such that on rotation of approximately 90° of the handle 22, the curved pitting knife 14 is rotated through 360°. An adjustable stop 26 is provided for limiting the rearward movement of the handle 22 so that the curved knife 14 will be aligned with the cutting edge of the fixed impaling blade 5 when the handle 22 is moved to the rearward position. A stop 26 comprises a pin 27 which is screw-threaded in an extension formed on the frame-casting 1 and engages a boss 28 formed on the handle arm 25. A lock-nut 29 is provided for locking the stop in the adjusted position.

A fruit holder 30 is pivotally mounted on the frame-casting 1 at a pin 31 mounted in the boss 32, the fruit holder 30 being supported by a spring arm 33 from the pin 31. While the fruit holder 30 is herein illustrated as being of such construction as to require manual operation, it is, however, contemplated that any desired or preferred manner of fruit holding means might be employed and be operated in a manner similar to that illustrated in the copending application of Albert R. Thompson, filed February 2, 1926, Serial No. 85,513, for fruit pitter.

The fruit impaling member 4, heretofore set forth, comprises a fixed fruit impaling blade 6. The fruit impaling members 5 and 6 have curved cutting edges 34 formed at their forward ends to provide a substantially V-shaped slot 35 into which the fruit is moved prior to engagement with the cutting edges 34. At the end of the cutting edges 34 the fruit impaling blades 5 and 6 are provided with complementary tapered edges 36 which are adapted to slide one over the other in the manner of a pair of scissors so that the same have a scissor-like overlapping action to sever the meat of the fruit completely around the pit thereof as the fruit is moved over the impaling member 4 to position the pit in the recess 13. The fruit impaling member 5 is tapered from its forward end to its rearward end slightly so as to spread the edges of the fruit which is inserted thereover so that the curved knife 14 will be positioned between the edges of the fruit without unnecessary damage to the flesh or meat thereof. The upper impaling blade 6 need not be so tapered as the spreading of the fruit will be effectually accomplished by the lower impaling blade 5. After the fruit is so positioned with its pit in the recess 13, the handle 22 is gripped by the operator with one hand and the fruit holder 30 gripped with the opposite hand and the handle 32 pulled forward which causes the curved pitting knife 14 to rotate to completely sever the pit from the flesh or meat of the fruit.

It will be obvious from the foregoing that I have provided means for pitting fruit, particularly clingstone peaches, wherein the fruit is moved solely in one direction and is not required to be rotated in order to halve the same and that the number of manual operations required to sever the peach and remove the pit therefrom is reduced to a minimum.

The modified form of this invention, illustrated in Figures 7 and 8, is similar to that modification heretofore described, with the exception that the movable fruit impaling blade $6^a$ is provided with means actuated by the single handle $22^a$ for driving the said blade $6^a$ toward the fixed impaling blade $5^a$ during the engagement of the fruit impaling member $4^a$ with the fruit. This means comprises a cam $37^a$ which is secured to the end of the shaft $19^a$ and which cam $37^a$ is engaged by a cam lug $38^a$ secured to the end of a flexible spring arm $39^a$ which is secured to the movable impaling blade $6^a$ as illustrated at $40^a$. In this modified form of this invention, spring means are not depended upon for forcing the movable impaling blade $6^a$ into the severing position illustrated at $7^a$ but if the spring arm $39^a$, because of its own spring qualities, forces the impaling blade $6^a$ into the severing position on actuation of the handle $22^a$ to rotate the curved pitting knife $14^a$, the blade $6^a$ is driven into the severing position. The cam $37^a$ has an abrupt cam actuating face $41^a$ so that the impaling blade $6^a$ is driven into the severing position on rotation of the handle $22^a$ through the shaft in a few degrees of its travel.

In the third modification of this invention, illustrated in Figure 9, the construction differs from that shown in Figures 1 and 2, in that the movable impaling blade $6^b$ is provided with a straight shank $42^b$ and passes through a bifurcated guide $53^b$ and is normally held in position away from the stationary impaling blade $5^b$. By a link $43^b$, pivotally mounted at the pin $44^b$, supported in the extension $45^b$ of the frame-casting $1^b$, the movable impaling blade $6^b$ is maintained in the position shown in Figure 9. The link being pivotally secured at a pin $46^b$, secured to the shank $42^b$ of the impaling blade $6^b$ and at its opposite end to a tension spring $47^b$, which tension spring $47^b$ is secured to an extension $48^b$ of the frame-casting $1^b$. The link $45^b$ is provided with a cam engaging surface $49^b$ at its under side which is secured to the shaft $19^b$. The cam $37^b$ being provided so that on actuation of the handle $22^b$, the link $43^b$ will be rotated on the pin $44^b$ to drive or force the movable impaling blade 6ᵇ toward the fixed impaling blade 5ᵇ in order that the curved pitting knife 14ᵇ will not be rotated by actuation of the handle 22ᵇ until the movable impaling blade 6ᵇ is moved downward toward the fixed impaling blade 5ᵇ to the cutting position. A clutch 50ᵇ is provided between the bosses 21ᵇ and 23ᵇ which clutch comprises an engaging member 51ᵇ mounted within an arcuate slot 52ᵇ formed in the boss 23ᵇ

Having fully described my invention, it is to be understood that I do not wish to be limited to the exact details of construction herein set forth which may obviously be varied without departing from the spirit of my invention as set forth in the appended claims.

I claim:

1. In a fruit pitter, the combination of a fixed impaling blade, a movable impaling blade, means for moving the movable impaling blade toward the fixed impaling blade, a curved pitting knife, and means for effecting relative movement between the said knife and impaler blades.

2. In a fruit pitter, the combination of a fixed impaling blade, a movable impaling blade, the said blades having curved cutting edges and complementary cutting edges, means for moving the movable impaling blade toward the fixed impaling blade, a curved pitting knife, and means for effecting relative movement between the said knife and impaling blades.

3. In a fruit pitter, the combination of a fruit impaling blade, a movable impaling blade, a curved pitting knife, and means for actuating the curved pitting knife and the said movable impaling blade.

4. In a fruit pitter, the combination of a bifurcated impaling member comprising a movable impaling blade and a fixed impaling blade, a revolvable pitting knife having its opposite ends mounted on one of said bifurcations, and means for axially rotating the said pitting knife.

5. In a fruit pitter, the combination of a fixed impaling blade, a movable impaling blade, complementary recesses formed in the said impaling blades forming a pit receiving recess, pitting means mounted in the recess formed in one of said impaling blades and in the plane of said blade, means for axially rotating the pitting means, and means for moving the movable impaling blade relative to the fixed impaling blade.

6. In a fruit pitter, the combination of a fixed impaling blade, a movable impaling blade, a curved pitting knife, means for rotating the said pitting knife, cutting edges formed on the said impaling blades, and means for moving the said movable blade to cause said cutting edges of the said blades to overlap.

7. In a fruit pitter, the combination of a bifurcated impaling member comprising a fixed impaling blade and a movable impaling blade, a curved pitting knife, curved cutting edges formed on the said impaling blades forming a V-shaped slot, complementary overlapping cutting edges on the said impaling blades for severing the flesh of the fruit around the pit, means for moving the movable impaling blade toward the peach, a curved pitting knife having its opposite ends mounted on the said impaling blades, and means for axially rotating the said pitting knife.

8. A fruit pitter comprising two opposed blades pivotally connected to each other, there being complementary recesses formed in the blades adapted to cooperate to receive the pit, the forward edges of the blades being divergent, so that fruit may be forced therebetween, lifting the upper blade and causing the blades to slit the fruit about the pit, and means for cutting the fruit about the pit.

9. A fruit pitter comprising two opposed blades pivotally connected to each other, there being complementary recesses formed in the blades adapted to cooperate to receive the pit, the forward edges of the blades being divergent, so that fruit may be forced therebetween, lifting the upper blade and causing the blades to slit the fruit about the pit, and an arcuate knife mounted for rotation upon one of said blades adapted to cut the pulp of the fruit from around the pit.

Signed at Los Angeles, Calif., this 27th day of January, 1926.

EARL R. ANDERSON.